(12) United States Patent
Barraud

(10) Patent No.: US 12,109,528 B2
(45) Date of Patent: Oct. 8, 2024

(54) PLANT FOR THE MEMBRANE PERMEATION TREATMENT OF A BIOGAS STREAM WITH A MEMBRANE SEPARATION UNIT CONTAINING TWO MODULES

(71) Applicant: L'Air Liquide Societe Anonyme pour l'Etude et l'Exploitation des Procedes Georges Claude, Paris (FR)

(72) Inventor: Francois Barraud, Sassenage (FR)

(73) Assignee: L'Air Liquide Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 380 days.

(21) Appl. No.: 17/700,966

(22) Filed: Mar. 22, 2022

(65) Prior Publication Data
US 2022/0297055 A1    Sep. 22, 2022

(30) Foreign Application Priority Data
Mar. 22, 2021    (FR) ...................................... 2102827

(51) Int. Cl.
*B01D 53/22*    (2006.01)
*C10L 3/10*    (2006.01)

(52) U.S. Cl.
CPC ......... *B01D 53/226* (2013.01); *B01D 53/229* (2013.01); *C10L 3/104* (2013.01); *C10L 2290/46* (2013.01); *C10L 2290/548* (2013.01)

(58) Field of Classification Search
CPC .................. C10L 2290/46; C10L 3/104; C10L 2290/548; B01D 53/226; B01D 53/229
See application file for complete search history.

(56) References Cited

U.S. PATENT DOCUMENTS 9,770,687 B2    9/2017    Ungerank et al.
9,988,326 B2    6/2018    Paget et al.
(Continued)

FOREIGN PATENT DOCUMENTS

EP    3 666 368    6/2020
FR    3 084 840    2/2020
(Continued)

OTHER PUBLICATIONS

French Search Report for FR 2 102 827, mailed Feb. 28, 2022.

*Primary Examiner* — Anthony R Shumate
(74) *Attorney, Agent, or Firm* — Yan Jiang; Christopher J. Cronin

(57) ABSTRACT

Process and plant for membrane permeation treatment of a carbon dioxide and methane-containing biogas stream in which the biogas stream is compressed with a compressor and the compressed biogas stream is fed to a membrane separation unit comprising first and second modules each containing at least one membrane selective for carbon dioxide over methane. The first module separates the compressed biogas stream into a first, second, and third methane-deficient permeates (in comparison to the biogas stream) and a first methane-enriched retentate (in comparison to the biogas stream). The first permeate being richer in methane than the second or third permeates. The second module separates the first permeate into a fourth methane-deficient permeate and a second methane-enriched retentate. The second and third retentates are recycled back to an inlet of the compressor.

7 Claims, 1 Drawing Sheet

(56) References Cited

U.S. PATENT DOCUMENTS

| | | | |
|---|---|---|---|
| 11,045,760 B2 | 6/2021 | Chareyre et al. | |
| 11,219,856 B2 | 1/2022 | Barraud et al. | |
| 2010/0287981 A1* | 11/2010 | Chen | C01B 3/48 |
| | | | 62/619 |
| 2014/0243574 A1* | 8/2014 | Karode | B01D 53/226 |
| | | | 585/818 |
| 2016/0229771 A1* | 8/2016 | Paget | B01D 53/226 |
| 2018/0250627 A1* | 9/2018 | Zick | B01D 53/226 |
| 2019/0176083 A1* | 6/2019 | Bauer | C01B 23/0052 |
| 2020/0047112 A1* | 2/2020 | Chareyre | B01D 53/30 |
| 2020/0398217 A1* | 12/2020 | Barraud | C10L 3/104 |
| 2020/0407653 A1* | 12/2020 | Barraud | B01D 53/226 |
| 2021/0299605 A1* | 9/2021 | Henry | C07C 7/005 |
| 2021/0339189 A1* | 11/2021 | Winkler | B01D 53/869 |
| 2023/0114525 A1* | 4/2023 | Henry | B01D 53/226 |
| | | | 96/9 |
| 2023/0271130 A1* | 8/2023 | Priske | B01D 53/227 |
| | | | 96/7 |
| 2023/0338889 A1* | 10/2023 | Valentin | B01D 3/148 |
| 2024/0001293 A1* | 1/2024 | Mitariten | B01D 53/047 |

FOREIGN PATENT DOCUMENTS

| | | |
|---|---|---|
| WO | WO 2014/075850 | 5/2014 |
| WO | WO 2015/036709 | 3/2015 |

* cited by examiner

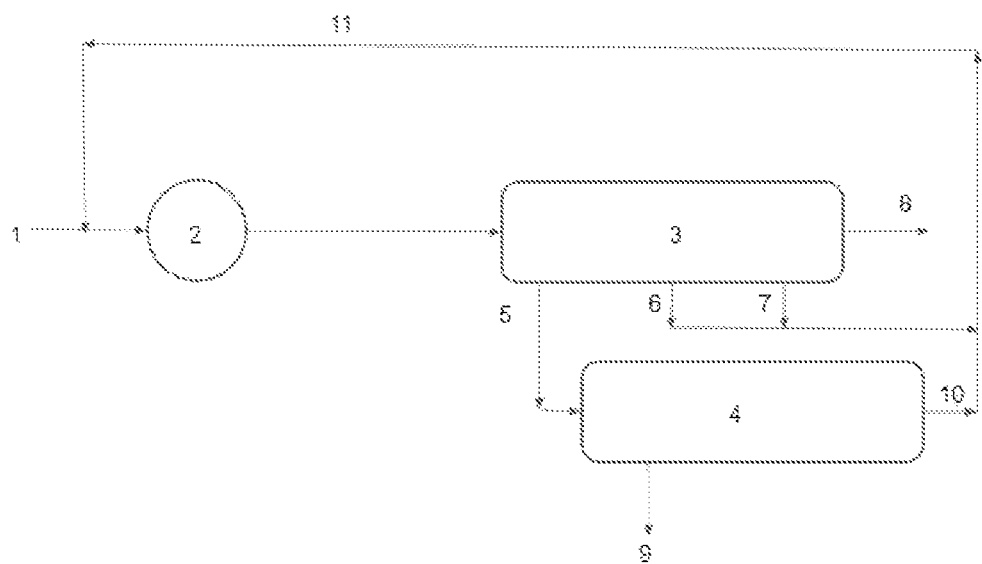

PLANT FOR THE MEMBRANE PERMEATION TREATMENT OF A BIOGAS STREAM WITH A MEMBRANE SEPARATION UNIT CONTAINING TWO MODULES

CROSS-REFERENCE TO RELATED APPLICATIONS

This application claims the benefit of priority under 35 U.S.C. § 119 (a) and (b) to French patent application No. FR 2102827, filed Mar. 22, 2021, the entire contents of which are incorporated herein by reference.

BACKGROUND

Field of the Invention

The present invention relates to a plant for the membrane permeation treatment of a biogas stream comprising at least methane and carbon dioxide in order to produce a methane-rich gas stream.

Related Art

Biogas is the gas produced during the degradation of organic matter in the absence of oxygen (anaerobic fermentation), also known as methanization. This may be natural degradation, thus it is observed in marshland or in household waste landfills. However, the production of biogas may also result from the methanization of waste in a dedicated reactor referred to as a methanizer or digester.

By virtue of its main constituents, methane and carbon dioxide, biogas is a powerful greenhouse gas. At the same time, it also constitutes a source of renewable energy which is appreciable in the context of the increasing scarcity of fossil fuels.

Biogas predominantly contains methane ($CH_4$) and carbon dioxide ($CO_2$) in proportions which can vary according to the way in which it is obtained and also contains, in smaller proportions, water, nitrogen, hydrogen sulfide, oxygen, and in trace amounts, other organic compounds.

Depending on the organic matter which has been degraded and on the techniques used, the proportions of the components differ, but on average biogas comprises (on a dry gas basis) 30-75% methane, 15-60% $CO_2$, 0-15% of nitrogen, 0-5% oxygen, and other trace compounds.

Biogas is upgraded in various ways. It can, after minor treatment, be upgraded close to the production site to supply heat, electricity or a mixture of both in a process called cogeneration. Because the high carbon dioxide content reduces its calorific value and increases the costs of compression and transportation, it limits the economic advantage of upgrading it to this nearby use.

More intensive purification of biogas allows it to be more widely used. In particular, intensive purification of biogas makes it possible to obtain a biogas which has been purified to the specifications of natural gas and which can be substituted for the latter; biogas thus purified is known as "biomethane". Biomethane thus supplements natural gas resources with a renewable part produced within territories. It can be used for exactly the same uses as natural gas of fossil origin. It can supply a natural gas network or a vehicle filling station and can also be liquefied to be stored in the form of liquefied natural gas (LNG).

The ways of upgrading biomethane are determined according to the local contexts, such as local energy requirements, possibilities of upgrading as biomethane fuel, and the existence nearby of natural gas distribution or transportation networks. By creating synergies between the various parties operating in a given territory such as, for example, farmers, manufacturers, and public authorities, the production of biomethane helps the territories to acquire greater energy self-sufficiency.

Several steps need to be completed between collecting the biogas and obtaining the biomethane which is the end product capable of being compressed or liquefied.

In particular, several steps are necessary before the treatment which is aimed at separating the carbon dioxide in order to produce a stream of purified methane. A first step is to compress the biogas which has been produced and brought in at atmospheric pressure, and this compression can be obtained in the conventional way by using a compressor. The following steps are aimed at stripping the biogas of the corrosive components, which are hydrogen sulfide and volatile organic compounds (VOCs). The technologies used are, conventionally, pressure swing adsorption (PSA) and trapping on activated carbon. Next, comes the step which consists of separating the carbon dioxide in order to ultimately have available methane that is at a purity required for its subsequent use.

Carbon dioxide is a contaminant typically present in natural gas and it is common practice to need to remove it therefrom. Various technologies are used for this depending on the situation. Among these, membrane technology is particularly effective when the $CO_2$ content is high. It is thus used to separate the $CO_2$ present in biogas originating from digester gas or landfill gas.

Membrane gas separation processes used for the purification of a gas, whether they use one or more membrane stages, have to make it possible to produce a gas at the required quality for a low cost while at the same time minimizing losses of the gas which it is desired to upgrade. Thus, in the case of biogas purification, the separation performed is chiefly a $CH_4/CO_2$ separation which needs to allow the production of a gas containing, depending on its use, more than 85% $CH_4$, preferably more than 95% $CH_4$, more preferentially more than 97.5% $CH_4$, while minimizing the $CH_4$ losses in the residual gas and the cost of purification. The cost of purification is to a large extent associated with the electricity consumption of the device that compresses the gas upstream of the membranes.

It is preferable for the plants that allow the production of a methane-enriched gas stream to be able to control the methane loss.

It is known that the system containing three membrane stages improves the methane yield compared to a system containing two membrane stages. However, although the system containing three membrane stages makes it possible to improve in particular the degree of recovery of the gas to be upgraded ($CH_4$ in the case of biogas) without adding the cost of an intermediate compressor, it follows therefrom that without intermediate compression of the permeate, a good separation is not obtained in the 3rd membrane, and thus the retentate of the 3rd membrane stage contains a greater proportion of gas to be removed that has not permeated in the 3rd stage. In order to remove this gas, it is needlessly recompressed and increases the electricity consumption of the compressor. Thus, in the case of biogas, in the absence of intermediate compression of the permeate of the first membrane before it passes into the third membrane stage, the retentate of the 3rd membrane stage will recycle a proportion of $CO_2$ to the inlet of the compressor. It would therefore be advantageous to reduce this proportion of recycled $CO_2$.

Therefore, there remains a need for improvement of the process for membrane separation of methane and carbon dioxide contained in a biogas that makes it possible to obtain high-purity methane, with a very good yield, while reducing the operating cost of the system.

SUMMARY OF THE INVENTION

One solution of the present invention is a plant for the membrane permeation treatment of a biogas stream 1 comprising at least methane and carbon dioxide, comprising: a compressor 2 for compressing the biogas stream 1; a membrane separation unit containing two modules; and at least one means 11 for recycling the second retentate 10 and the third permeate 7 to the inlet of the compressor 2. The first module 3 is capable of receiving the compressed biogas stream and providing a first permeate 5, a second permeate 6 and a third permeate 7 and a first retentate 8. The second module 4 is capable of receiving the first permeate 5 from the first module and providing a fourth permeate 9 and a second retentate 10. Each module comprises at least one membrane that is more permeable to carbon dioxide than to methane.

Another solution of the present invention is a process for the membrane permeation treatment of a methane and carbon dioxide-containing biogas stream, comprising the steps of:
providing a plant comprising a compressor and a membrane separation unit that comprises first and second modules each comprising at least one membrane that is more permeable to carbon dioxide than methane, wherein:
the first module is adapted and configured to receive the compressed biogas stream and separate it into a first permeate, a second permeate, a third permeate, and a first retentate, and
the second module is adapted and configured to receive the first permeate from the first module and separate it into a fourth permeate and a second retentate;
compressing the biogas stream, the compressor producing a compressed biogas stream;
supplying the first module with the compressed biogas stream and separating the supplied compressed biogas stream into a first retentate that is enriched in methane relative to the biogas stream and first, second, and third permeates each of which is enriched in carbon dioxide relative to the biogas stream, the first permeate being richer in methane than the second or third permeates;
supplying the second module with the first permeate and separating the supplied first permeate into a second retentate that is enriched in methane relative to the first permeate and a fourth permeate that is enriched in carbon dioxide relative to the first permeate; and
recycling the second retentate and the third permeate to the inlet of the compressor where they are compressed with the biogas stream to produce the compressed biogas stream.

Note that preferably a single recycling means enables the combined recycling of the second retentate 10, and of the second permeate 6 and third permeate 7.

Preferably, the fourth permeate 9 is discharged to the atmosphere or is upgraded to recover the $CO_2$.

BRIEF DESCRIPTION OF THE FIGURES

FIG. 1 illustrates an example of a plant according to the invention.

DETAILED DESCRIPTION OF THE INVENTION

Depending on the case, the plant according to the invention can have one or more of the features below:
the recycling means 11 enables a recycling of the second permeate 6 to the inlet of the compressor 2,
the membranes within each module have the same selectivity,
at least one module comprises a membrane with different selectivity,
the plant comprises, upstream of the compressor 2, at least one means for prepurifying the biogas stream; note that the one or more means for prepurifying the biogas stream are chosen from means for prepurifying the biogas to be treated that are capable of ensuring, depending on the requirements, all or some of the functions of drying, $CO_2$ reduction, removal of the volatile organic compounds (VOCs).
the plant comprises a means P for measuring the pressure of the first retentate 8;
the plant comprises a means C for measuring the methane concentration in the first retentate 8; note that the means P and C make it possible to check that the biomethane produced (first retentate) has the required specificities; preferably, the plant will also comprise a means for comparing the measured pressure and/or the measured concentration with target pressure and concentration values and a means for sending the first retentate back to the methanizer producing the biogas stream, if the measured value(s) are below the target values.
the plant comprises a means for setting the pressure of the first retentate 8 as a function of the methane concentration measured in the first retentate 8.
the plant comprises a means for setting the pressure of the second retentate 10.

The present invention also relates to a process for the membrane permeation treatment of a biogas stream 1 comprising at least methane and carbon dioxide, using a plant according to the invention, and comprising:
a) a step of compressing 2 the biogas stream 1,
b) a step of supplying the first module 3 with the compressed biogas stream so as to produce a first retentate 8 that is enriched in methane relative to the biogas stream to be treated and a first permeate 5, a second permeate 6 and a third permeate 7 that are enriched in carbon dioxide relative to the biogas stream; with the first permeate 5 richer in methane than the second permeate 6 and the third permeate 7,
c) a step of supplying the second module 4 with the first permeate 5 so as to produce a second retentate 10 that is enriched in methane relative to the first permeate 5 and a fourth permeate 9 that is enriched in carbon dioxide relative to the first permeate, and
d) a step of recycling 11 the second retentate 10 and the third permeate 7 to the inlet of the compressor 2.

The second permeate will be either recycled or sent to the second module 4.

Depending on the case, the process according to the invention can have one or more of the features below:

the process comprises, upstream of the compression step 2, at least one step of prepurifying the biogas stream 1; note that the prepurification step(s) are preferably chosen from drying, $CO_2$ reduction or removal of the volatile organic compounds (VOCs), the process comprises a step of measuring the pressure of the first retentate 8; preferably the process will comprise a step of comparing the measured pressure with a target pressure value and a step of sending the first retentate back to the methanizer producing the biogas stream if the measured pressure is lower than the target pressure value;

the process comprises a step of measuring the methane concentration in the first retentate 8; preferably the process will comprise a step of comparing the measured concentration with a target concentration value and a step of sending the first retentate back to the methanizer producing the biogas stream if the measured concentration is lower than the target concentration value;

the process comprises a step of setting the pressure of the first retentate 8 as a function of the methane concentration measured in the first retentate 8, the process comprises a step of setting the pressure of the second retentate 10. This step will be carried out so as to keep the methane level at the vent as low as possible.

The measuring step, the comparing step and the setting step are carried out automatically by data transmission and data processing means.

Note that depending on the amount of biogas to be treated, the plant according to the invention may comprise, in parallel, several membrane separation units containing two modules as defined previously. The biogas stream will then be divided between these various membrane separation units.

The solution proposed by the present invention makes it possible to simplify the process for membrane permeation treatment of a biogas stream while reducing its production cost and while retaining the same performance as a system containing three membrane stages.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

The invention claimed is:

1. A process for a membrane permeation treatment of a methane and carbon dioxide-containing biogas stream, comprising the steps of:
   providing a plant comprising a compressor and a membrane separation unit that comprises first and second modules each comprising at least one membrane that is more permeable to carbon dioxide than methane, wherein:
      the first module is adapted and configured to receive a compressed biogas stream and separate it into a first permeate, a second permeate, a third permeate, and a first retentate, and
      the second module is adapted and configured to receive the first permeate from the first module and separate it into a fourth permeate and a second retentate;
   compressing the biogas stream, the compressor producing the compressed biogas stream;
   supplying the first module with the compressed biogas stream and separating the supplied compressed biogas stream into a first retentate that is enriched in methane relative to the biogas stream and first, second, and third permeates each of which is enriched in carbon dioxide relative to the biogas stream, the first permeate being richer in methane than the second or third permeates;
   supplying the second module with the first permeate and separating the supplied first permeate into a second retentate that is enriched in methane relative to the first permeate and a fourth permeate that is enriched in carbon dioxide relative to the first permeate; and
   recycling the second retentate and the third permeate to the inlet of the compressor where they are compressed with the biogas stream to produce the compressed biogas stream.

2. The process of claim 1, further comprising prepurifying the biogas stream upstream of the compressor so as to dry the biogas stream, reduce a $CO_2$ concentration of the biogas stream, and/or remove volatile organic compounds from the biogas stream.

3. The process of claim 1, further comprising the steps of:
   measuring a methane concentration of the first retentate; and
   setting a pressure of the first retentate as a function of the measured methane concentration.

4. The process of claim 1, wherein the biogas stream is produced by a methanizer and said process further comprises the steps of:
   measuring a pressure of the first retentate;
   comparing the measured pressure with a target pressure value; and sending the first retentate back to the methanizer if the measured pressure is lower than the target pressure value.

5. The process of claim 1, wherein the biogas stream is produced by a methanizer and said process further comprises the steps of:
  measuring a methane concentration of the first retentate;
  comparing the measured concentration with a target concentration value; and
  sending the first retentate back to the methanizer if the measured concentration is lower than the target concentration value.

6. The process of claim 1, wherein each of the membranes of the first and second modules have a same carbon dioxide to methane selectivity.

7. The process of claim 1, wherein at least one of the first and second modules comprises a membrane with first carbon dioxide to methane selectivity that is different from another membrane or membranes of the first and second modules.

\* \* \* \* \*